United States Patent
Nilsson

(10) Patent No.: US 9,788,523 B2
(45) Date of Patent: Oct. 17, 2017

(54) APPARATUS AND A METHOD FOR CLEANING MILKING STALLS ON A ROTARY PLATFORM OF A ROTARY PARLOUR

(71) Applicant: DELAVAL HOLDING AB, Tumba (SE)

(72) Inventor: Mats Nilsson, Uttran (SE)

(73) Assignee: DELAVAL HOLDING AB, Tumba (SE)

( * ) Notice: Subject to any disclaimer, the term of this patent is extended or adjusted under 35 U.S.C. 154(b) by 616 days.

(21) Appl. No.: 14/376,456

(22) PCT Filed: Mar. 8, 2013

(86) PCT No.: PCT/SE2013/050206
§ 371 (c)(1),
(2) Date: Aug. 4, 2014

(87) PCT Pub. No.: WO2013/137804
PCT Pub. Date: Sep. 19, 2013

(65) Prior Publication Data
US 2015/0047676 A1   Feb. 19, 2015

Related U.S. Application Data

(60) Provisional application No. 61/610,585, filed on Mar. 14, 2012.

(30) Foreign Application Priority Data

Mar. 14, 2012   (SE) ........................................ 1250239

(51) Int. Cl.
*B08B 7/04* (2006.01)
*A01J 7/02* (2006.01)
*A01K 1/12* (2006.01)

(52) U.S. Cl.
CPC ............... *A01J 7/022* (2013.01); *A01K 1/126* (2013.01); *Y10S 901/43* (2013.01)

(58) Field of Classification Search
None
See application file for complete search history.

(56) References Cited

U.S. PATENT DOCUMENTS 8,074,600 B2   12/2011   Kallen et al.

FOREIGN PATENT DOCUMENTS

DE           202 21 423 U1    11/2005
DE     10 2010 034 300 A1      2/2012
(Continued)

OTHER PUBLICATIONS

Supplementary ISR dated May 30, 2014.*
International Search Report, dated Sep. 20, 2013, from corresponding PCT application.

*Primary Examiner* — Eric Golightly
(74) *Attorney, Agent, or Firm* — Young & Thompson

(57) ABSTRACT

An apparatus and method for cleaning milking stalls on a platform of a rotary parlour. The rotary parlour includes a robotic manipulation device configured to perform a primary task; a holding device configured to hold the end portion of the hose member in a predetermined parking position, and a control unit. When it is time to clean a milking stall on the platform, the control unit activates the robotic manipulation device such that, instead of performing a primary task, the robotic manipulation device performs an additional task in which the robotic manipulation device grips the end portion of a hose member and moves the end portion from a parking position to a number of cleaning positions from which liquid jets are sprayed from the outlet opening of the end portion against predetermined surfaces to be cleaned in the milking stall.

20 Claims, 3 Drawing Sheets

(56) References Cited

FOREIGN PATENT DOCUMENTS

| | | |
|---|---|---|
| EA | 200970802 A1 | 12/2009 |
| EP | 1 230 844 A1 | 8/2002 |
| EP | 1 523 878 A1 | 4/2005 |
| EP | 1 523 879 A2 | 4/2005 |
| EP | 2 060 169 A1 | 5/2009 |
| FR | 2 882 501 A1 | 9/2006 |
| GB | 2480634 A | 11/2011 |
| SU | 718060 A1 * | 2/1980 |
| SU | 1658936 A1 * | 6/1991 |

* cited by examiner

APPARATUS AND A METHOD FOR CLEANING MILKING STALLS ON A ROTARY PLATFORM OF A ROTARY PARLOUR

THE BACKGROUND OF THE INVENTION AND PRIOR ART

The present invention relates to an apparatus and a method for cleaning milking stalls on a platform of a rotary parlour, wherein the rotary parlour comprises a robotic manipulation device configured to perform a primary task in the milking stalls, and wherein the apparatus comprises a hose member having an end portion with an outlet opening and liquid regulating means by which it is possible to regulate the liquid supply to the end portion of the hose member.

In a conventional rotary parlour, the cows walk on to an annular rotating platform and enter a milking stall. In a partly automatic rotary parlour, a milking robot located on the outside or on the inside of the annular platform attaches teat cups to the teats of the cows. The platform usually rotates with a constant low speed. The milking processes of the cows are finished and the cows leave the milking stalls before they have rotated one full revolution on the platform. The continuous flow of cows causes rotary parlours to have a high milking capacity. In order to provide a fully automatic rotary parlour, it has been suggested to use a robot arm for preparation of teats before the milking process, a robot arm for teat cup attachment and a robot arm for treatment of teats after the milking process.

The milking stalls on the rotary platform are to be cleaned with regular intervals. The cleaning processes of the milking stalls are usually manually performed by an operator spraying water from a water hose on the floor surface in the milking stalls and on other surfaces in the milking stall which are dirty and have to be cleaned. The cleaning of the milking stalls on the platform requires a lot of work for an operator.

It is also known to have a hose arranged in a fixed position in the vicinity of the platform which continuously sprays water on the floor surfaces in the milking stalls when the milking stalls rotate through the water jet. Such a cleaning process of the milking stalls is not especially effective and it also consumes a lot of water.

EP 2 060 169 shows an apparatus for cleaning teat cups arranged in teat cup magazines in milking stalls on a rotary platform. A robotic manipulation device is used for moving the teat cups from the respective teat cup magazines to a cleaning implement when it is time to clean the teat cups.

SUMMARY OF THE INVENTION

The object of the present invention is to perform an automatic cleaning of the milking stalls of a rotary parlour provided with a robotic manipulation device performing a primary task in the milking stalls. A further object is to provide an effective cleaning process with a relatively low consumption of a cleaning liquid.

This object is achieved by the apparatus initially defined, which is characterised in that that the apparatus comprises a holding device configured to hold the end portion of the hose member in a predetermined parking position, and a control unit, wherein the control unit is, when it is time to clean a milking stall on the platform, configured to activate the robotic manipulation device such that it instead of its primary task performs an additional task in which it grips the end portion of the hose member in the holding device and moves it from the parking position to a number of cleaning positions from which liquid jets are sprayed from the outlet opening of the end portion against predetermined surfaces to be cleaned in the milking stall.

In most cases, an existing robotic manipulation device can be used to perform this additional task without the need for redesign. Since the end portion of the hose member is arranged in a predetermined parking position, it is easy for the robotic manipulation device to find and grip the end portion and move it to a number of cleaning positions. Preferably, the robotic manipulation device has capacity to move the end portion of the hose member to a relatively large number of cleaning positions from which it is possible to spray liquid jets against substantially all surfaces in a milking stall. Consequently, it is possible to provide a very effective cleaning of the milking stall by means of the apparatus. The predetermined surfaces in the milking stall to be cleaned may be the whole floor surface in the milking stall and the outer surfaces of substantially all components in the milking stall. In this case, the apparatus performs an automatic cleaning process of the milking stalls. Thus there is no need for an operator which cleans the milking stall at regular intervals. The apparatus may comprise a control unit included in a global control system of the rotary parlour. Alternatively, the control unit may be included in a local control system.

According to a preferred embodiment of the invention, the control unit is configured to control the robotic manipulation device such that it moves the end portion of the hose member to different cleaning positions along a predetermined moving path during a cleaning process of the surfaces in the milking stall. It is possible to determine in advance a number of cleaning positions from which it is possible to reach the predetermined surfaces in a milking stall by liquid jets. Certain surfaces in a milking stall become more polluted than others, such as the rear part of the floor surface in the milking stall. Preferably, more time is spent cleaning a surface which usually is very polluted. By the use of a suitable predetermined moving path, the milking stalls will always be cleaned in a desired manner. The control unit may include different kinds of programs in which the robotic manipulation moves along different predetermined moving paths. In this case, it is possible to select a suitable program for different occasions.

According to an embodiment of the invention, the control unit is configured to control the liquid regulating means and thereby the quantity of liquid sprayed against the surfaces in the milking stall. The liquid regulating means may be a valve in the hose member or in a water conduit connected to a conventional water supply system. Since the control unit controls the liquid regulating means, it is for example possible to supply a large quantity of liquid in a jet against surfaces which usually are very polluted than against surfaces which usually are less polluted. Furthermore, the control unit may turn off the valve temporary when the robotic manipulation device moves the end portion of the hose member between different cleaning positions. The control unit may start the liquid supply by means of the valve when the cleaning process starts and turn it off when the cleaning process has been finished. Such a control of the liquid supply results in a low consumption of liquid. The liquid may be water or water with a detergent.

According to a preferred embodiment of the invention, the robotic manipulation device has the primary task to attach teat cups to animals in the milking stalls. Alternatively, the robotic manipulation device has the primary task to perform a treatment of the teats of animals in the milking stalls after a milking process has been finished. According to a further alternative, the robotic manipulation device has the primary task to perform a treatment of the teats of animals in the milking stalls before the teat cups are attached to the teats. The robotic manipulation devices can only perform the above mentioned primary tasks when an animal is in a milking stall. It is only possible to clean a milking stall when it is vacant. Since robotic manipulation devices have no primary task to fulfil when a milking stall is vacant, it is very suitable to use such an existing robotic manipulation device for performing a cleaning process of a vacant milking stall.

In voluntary rotary parlours, the milking stalls are vacant randomly. When the control unit is informed about the existence of a dirty vacant milking stall, it activates the robotic manipulation device such that it performs a cleaning process of the milking stall. In batch milking parlours, all animals in a herd are moved to the rotary parlour and milked at substantially the same time. When the milking process of the last animal in the herd has started, the following milking stalls are vacant. In this case, it is possible to use the robotic manipulation device for cleaning of the milking stalls by means of the hose member. It is here possible to clean the milking stalls sequentially as they arrive to the robotic manipulation device and the hose member.

According to a preferred embodiment of the invention, the apparatus comprises a detecting member configured to detect the presence of impurities in the milking stall and to send this information to the control unit. The detecting member may be a camera which records images of the milking stall. The control unit may comprise image analysing means detecting the presence of impurities in the milking stall. The control unit may be configured to determine which surfaces in a milking stall to be cleaned by means of information from the detecting member and to activate the robotic manipulation device such that it moves the end portion of the hose member to cleaning positions from which it is possible to clean these surfaces in the milking stall. In this case, it is possible to achieve a very good cleaning of the milking stall with a further reduced consumption of liquid.

According to a preferred embodiment of the invention, the control unit is configured to determine if the milking stall is to be cleaned or not by means of information from the detecting member. In this case, the control unit determines if the milking stall is sufficiently polluted to be cleaned. In this case, the milking stall is only cleaned when it is necessary. Alternatively, the control unit is configured to initiate a cleaning process of a milking stall on the platform after a predetermined number of milking processes in the milking stall. A cleaning process, may, for example, be performed after every third milking process in the milking stall. When a milking stall is dirty and has to be cleaned, an entrance gate or the like in an entrance area to the platform prevents that a new animal entrances the milking stall such that the milking stall is vacant when it arrives to the robotic manipulation device.

According to a preferred embodiment of the invention, the end portion of the hose member comprises a grip area configured to be gripped by the robotic manipulation device. It is here possible for a grip member or the like of the robotic manipulation device to hold the end portion in a grip position with a high accuracy. Especially, if the same robotic manipulation device is used for attaching the teat cups and for performing the cleaning process, the grip area of the end portion may have substantially the same size and shape as the grip area of a teat cup.

According to a preferred embodiment of the invention, the end portion of the hose member comprises at least one nozzle forming said water jet. A nozzle with a relatively small outlet opening forms a thinner liquid jet with a higher velocity than a nozzle with a large outlet opening. The end portion of the hose member may comprise at least two nozzles by which it is possible to spray liquid jets in different directions against different surfaces in the milking stall from one and the same cleaning position. It is here possible to clean several surfaces at the same time. The end portion of the hose member may comprise at least two nozzles by which it is possible to spray liquid jets of different kinds against surfaces in the milking stall. In this case, the surfaces in a milking stall may be cleaned by means of different kinds of liquid jets. It is here possible to select and use one of the nozzles for each surface to be cleaned. Each nozzle may receive liquid from a separate hose unit by means of a separate liquid regulating means. It is here possible to vary the quantity of liquid in the liquid jets against the surfaces in the milking stalls.

According to a preferred embodiment of the invention, the holding device and the robotic manipulation device are arranged radially outside of an outer edge portion of the platform. Alternatively, the holding device and the robotic manipulation device are arranged radially inside of an inner edge portion of the platform. The animals may be standing in a radial direction on the milking stall with the heads at an outer periphery of the platform or at an inner periphery of the platform. The rotary parlour is here of the parallel rotary type. Alternatively, the animals are standing in milking stalls with an inclination in relation the extension of the annular platform. The platform is here of the herringbone rotary type. The animals may also in this case have their heads at an inner periphery of the annular platform or at an outer periphery of the platform.

According to a further embodiment of the invention, the control unit is configured to control the robotic manipulation device such that it moves the end portion of the hose member to a cleaning position from which it is possible to spray a liquid jet against a predetermined surface to be cleaned outside the milking stall. Such a predetermined surface may be an outer surface of the holding device, an outer surface of the robotic manipulation device or a floor surface in the vicinity of the robotic manipulation device. These surfaces are to be cleaned with regular intervals. In this case, it is possible to use the apparatus according to present invention for this cleaning task.

The above mentioned objects are also achieved by the method defined in the claims 19 to 26.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED
EMBODIMENTS OF THE INVENTION

Figure 1:
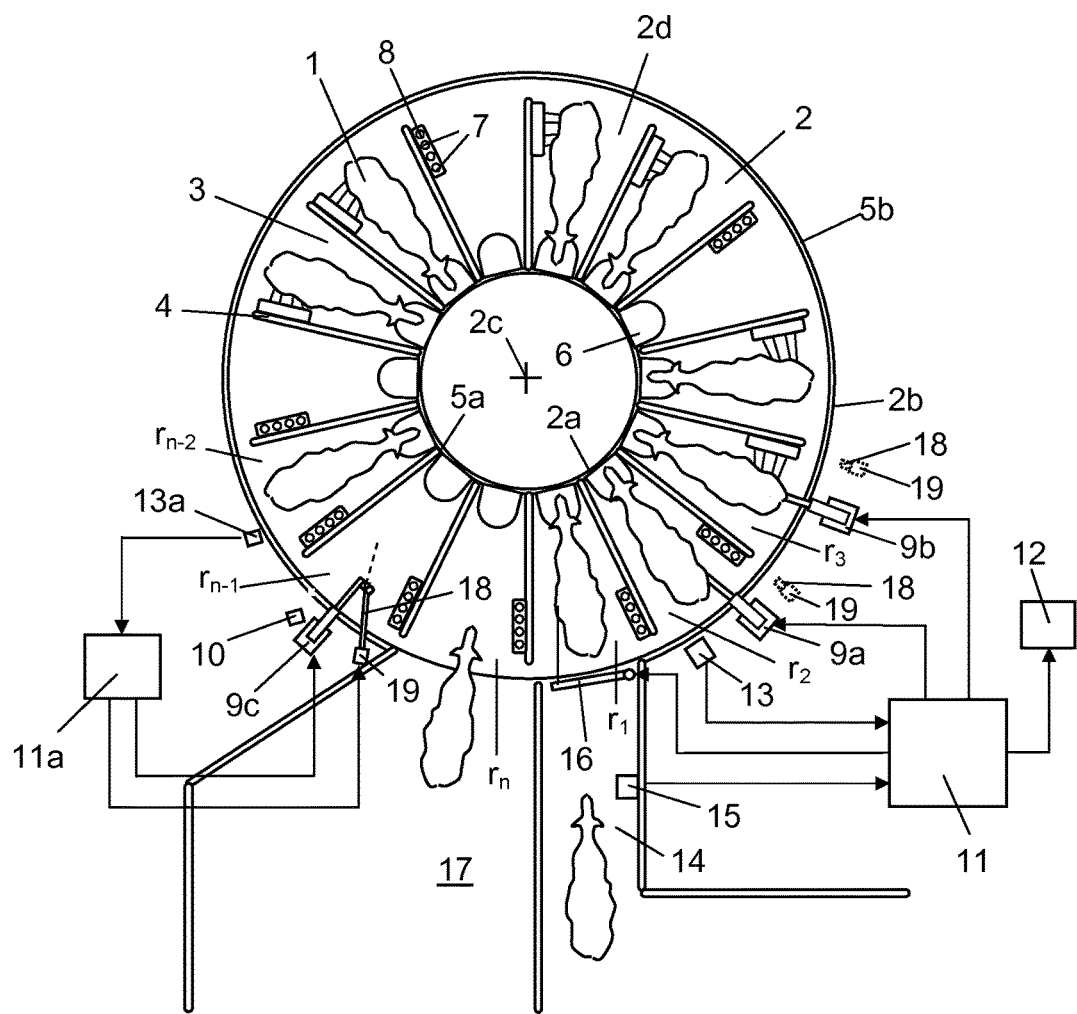
FIG. 1 shows a automatic rotary parlour provided with an apparatus for cleaning milking stalls.

FIG. 1 shows a rotary parlour for milking of cows 1. The rotary parlour comprises an annular platform 2 having an inner edge portion 2a and an outer edge portion 2b. The platform 2 rotates during operation around a vertical axis 2c. The platform 2 has an upper surface forming a floor surface 2d. A plurality of fence arrangements 4 are arranged on the platform 2. The fence arrangements 4 form milking stall 3 for receiving individual cows 1 in predetermined milking positions. In this case, the fence arrangements 4 have an essentially straight radial extension on the platform 2 between an inner end located at the vicinity of the inner edge portion 2a of the platform and an outer end located at the vicinity of the outer edge portion 2b of the platform. The fence arrangements 4 are arranged at equal intervals around the annular platform 2. An inner fence arrangement 5a is mounted around a main part of the inner periphery of the platform 2. An outer fence arrangement 5b is mounted around a main part of the outer periphery of the platform 2. The object of the fence arrangements 5a, 5b is to prevent that the cows 1 in the milking stalls 3 step out of the platform 2.

Each milking stall 3 is provided with a feeding trough 6 arranged in the vicinity of the inner periphery 2a of the platform. Each milking stall 3 is also provided with four teat cups 7 to be attached to the teats of a cow 1 standing in the milking stall 3. Each teat cup 7 is provided with a milk conduit and a pulsation conduit. Each milking stall 3 comprises a teat cup magazine 8 adapted to hold the teat cups 7 when they are not used. A first robotic manipulation device 9a, a second robotic manipulation device 9b and a third robotic manipulation device 9c are arranged I different positions on a floor surface at the side of the platform 2.

A control unit 11 of a global control system is adapted to control a schematically shown drive mechanism 12 for driving of the platform 2. The drive mechanism 12 may include a drive wheel mechanism, which is arranged in contact with a circular rail on the underside of the platform 2. A position sensor 13 is adapted to sense the rotational position of the platform 2 and to send a signal to the control unit 11 about the actual position of the platform 2. The rotary parlour comprises an entrance passage 14 to the platform 2. The entrance passage 14 is provided with a detecting sensor 15 and a movable gate 16. An exit area 17 is arranged in connection to the platform 2. The exit area 17 is entered by the cows 1 when they leave the platform 2.

In this case, the rotary parlour is a voluntary milking system. If a cow 1 wants to be milked, she walks to the entrance passage 14 leading to the rotary platform 2. The entrance passage 14 has a width such that only one cow 1 at a time can be located in a front position of the passage 14. The detection sensor 15 detects when a cow 1 arrives to the front position of the passage 14 and sends a signal to the control unit 11 with this information. The detection sensor 15 may be an identification sensor sensing the identity of the cow 1. The gate 16 is in a closed position when the cow 1 arrives to the front position of the entrance passage 14. The control unit 11 receives substantially continuously information from the position sensor 13 about the actual rotational position of the platform 2. When a milking stall 3 arrives to a first rotational position $p_1$, just in front of the gate 16, the control unit 11 opens the gate 16 and the cow 1 enters the platform 2. The gate 16 is moved to its closed position as soon as the whole cow 1 is inside the milking stall 3. The feeding trough 6 attracts the cow 1 and facilitates the positioning of the cow 1 in the milking stall 3. The rotary parlour is of the PR (Parallel Rotary) type. The cows 1 stand here in a radial direction on the platform 2 with their heads at the inner edge portion 2a of the platform 2.

When the milking stall 3 with the cow 1 has rotated to a second rotational position $r_2$, the control unit 11 activates the first robotic manipulation device 9a. The task of the first robotic manipulation device 9a is to perform a treatment of the teats of the cow 1 before the teat cups 7 are attached. This treatment may include a cleaning process of the teats. When the milking stall 3 with the cow 1 has rotated to a third rotational position $r_3$, the control unit 11 activates the second robotic manipulation device 9b. The task of the second robotic manipulation device 9b is to fetch the teat cups 7 in the teat cup magazine 8 and attach them to the cow 1. The platform 2 is driven with a speed such that it is no problem for the robotic manipulation devices 9a, 9b to compensate for the relative motions of the platform 2 when they perform their tasks.

The milking process of the cow 1 starts as soon as the teat cups have been attached to the teats of the cow 1. A milk meter (not shown) supervises the milk flow during the milking process. As soon as the milk flow drops below a predetermined value, a removing device (not shown) removes the teat cups 7 from the teats of the cow 1. The milking process proceeds during nearly one revolution on the platform 2. If the teat cups 7 have not been removed earlier, they are at least removed when the milking stall 3 reaches a third last rotational position $r_{n-2}$. A local control unit 11a included in a local control system controls the third robotic manipulation device 9c. The local control unit 11a activates the third robotic manipulation device 9c when the milking stall 3 with the cow 1 arrives to a second last rotational position $r_{n-1}$. The task of the third robotic manipulation device 9c is to perform a treatment of the teats of the cow 1 after the milking process. The aftertreatment may be to spray a disinfecting medium on the teats of the cow 1. The third robotic manipulation device 9c may carry a spray nozzle or the like connected to a schematically disclosed container 10 with disinfecting medium arranged at the side of the platform 2. When the aftertreatment of the teats is finished and the milking stall 3 reaches a last rotational position $r_n$, the cow 1 leaves the milking stall 3 and enters the exit area 17.

A hose member 18 in arranged in a holding device 19 at the outside of the platform 2 in the vicinity of the third robotic manipulation device 9c. If a vacant and dirty milking stall 3 reaches the second last rotational position $r_{n-1}$, the local control unit 11a activates the third robotic manipulation device 9c such that it grips the hose member 18 in the holding device 19. The third robotic manipulation device 9c moves the hose member 18 from a parked position in the holding device 19 to different cleaning positions from which water jets are sprayed out from the hose member 18 to predetermined surfaces to be cleaned in the milking stall 3. After the cleaning process of the milking stall 3, the vacant and clean milking stall 3 is ready to receive a new cow 1 when it arrives to the first rotational position $r_1$.

Alternatively, a hose member 18 is arranged in a holding device 19 at the outside of the platform 2 in the vicinity of the first robotic manipulation device 9a or in the vicinity of the second robotic manipulation device 9b. Such alternatively placed hose members 18 and holding devices 19 are marked with dotted lines in FIG. 1.

Figure 2:
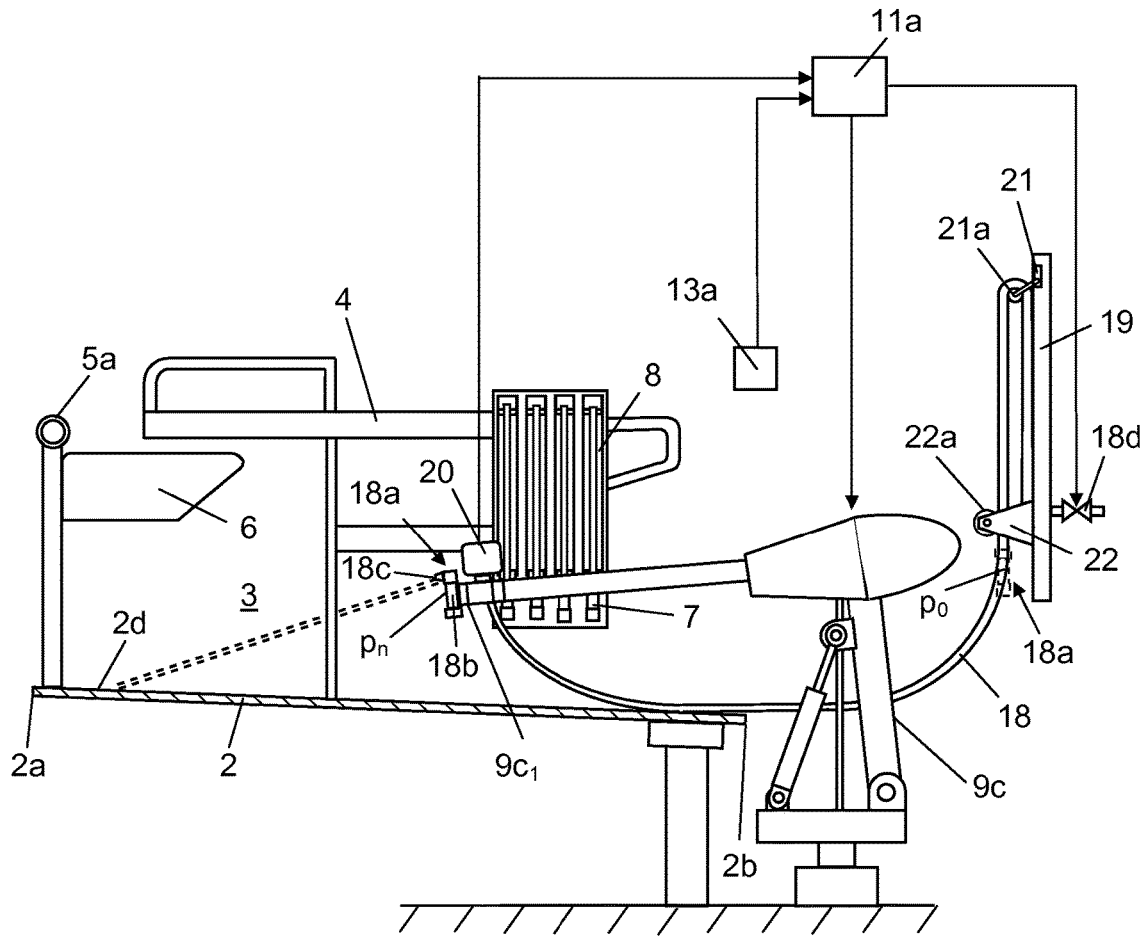
FIG. 2 shows a side view of an apparatus for cleaning milking stalls.

FIG. 2 shows a view from the side of a vacant and dirty milking stall 3 in the second last rotational position $p_{n-1}$. The hose member 18 comprises an end portion 18a provided with a grip area 18b and a spray nozzle 18c. The hose member 18 is arranged in a holding device 19 which is arranged at the side of the platform 2 in the vicinity of the third robotic manipulation device 9c. The holding device 19 comprises a guiding element 21 supporting a first rolling member 21a supporting the highest point of the hose member 18 in the holding device 19. The hose member 18 extends downwardly from the first rolling member 21a to a second rolling member 22a arranged in a stationary part of the holding device. When the movable guiding element 21 is located in an upper end position in the holding device 19, the end portion 18a of the hose member 18 is in a parking position $p_0$ in the holding device 19. When the movable guiding element 21 is displaced to a lower position in the holding device 19, the hose member 18 is released to a length corresponding to the vertical position of the movable guiding element 21.

The vertical motions of the guiding element 21 in the holding device 19 may be controlled by a spring, a pneumatic cylinder or an electric motor. A valve 18d is arranged in or on a water conduit connected to the hose member 18. The valve 18d can be set in a closed position in which no water is supplied to the hose member 18 and in at least one open position in which water is supplied to the hose member 18 and sprayed out through the water nozzle 18c at the end portion 18a of the hose member 18. The third robotic manipulation device 9c comprises a grip member $9c_1$ able to grip the grip area 18b of the hose member 18. A camera 20 is mounted on the third robotic manipulation device 9c in the vicinity of the grip member $9c_1$. The local control unit 11a receives information from the camera 20 and the position sensor 13a. The local control unit 11a may control the third robotic manipulation device 9c and the valve 18d by means of information from the camera 20 and the position sensor 13a.

In this case, the rotary parlour is based on voluntary visits of the cows 1. When a vacant milking stall 3 reaches the second last rotational position $r_{n-1}$, the local control unit 11a determines if the milking stall 3 is to be cleaned or not. The local control unit 11a receives information from a local position sensor 13a about the rotational position of the platform 2. The local control unit 11a has stored information about the use of the individual milking stall 3 on the rotary platform 2. In many rotary parlours, it is not necessary to clean the milking stall 3 every time it has been used. The milking stall 3 may, for example, be cleaned when it has been used a predetermined number of times. In this case, it is also possible for the local control unit 11a to determine if a milking stall 3 is to be cleaned in view of images from the camera 20.

In case the control unit 11 determines that a milking stall 3 arriving to the second last rotational position $p_{n-1}$ is to be cleaned, it activates the third robotic manipulation device 9c. The third robotic manipulation device 9c moves the grip member $9c_1$ towards the holding device 19 and grips the grip area 18b of the hose member 18. The third robotic manipulation device 9c moves the grip area 18b from the parking position $p_0$ in the holding device 19 to different positions $p_n$ from which water jets are sprayed out from the nozzle 18c of the hose member 18 to predetermined surfaces to be cleaned in the milking stall 3. The third robotic manipulation device 9c is capable to move the end portion of 18a of the hose member 18 to positions $p_n$ in the milking stall 3 from which it is possible to supply water jets from the nozzle 18c to substantially all surfaces in the milking stall to be cleaned. These surfaces may include the whole floor surface in the milking stall and all outer surfaces of components and milking equipment in the milking stall such as outer surfaces of the fence arrangement 4, the feeding trough 6, the teat cups 7, the teat cup magazine 8 etc to.

The local control unit 11a is provided with software defining a predetermined path along which the third robotic manipulation device 9c moves the end portion 18a of the hose member 18 during a cleaning process. The grip member $9c_1$ of the third robotic manipulation device 9c may hold the end portion 18a of the hose member 18 during a period of time in one or several stationary positions $p_n$ along said path in which the water jet is directed against highly contaminated surfaces in the milking stall 3. Alternatively the grip member $9c_1$ of the third robotic manipulation device 9c may move the end portion 18a of the hose member 18 substantially the whole time along a predetermined path during a cleaning process. The control unit 11 may also be able to vary the opening degree of the valve 18d in order to vary the quantity of water sprayed on the surfaces in the milking stall from the nozzle 18c. During the cleaning process of the milking stall 3, the control unit 11 receives substantially continuously information from the local position sensor 13a. Thereby, it is possible to activate the third robotic manipulation device 9c such that it moves the end portion 18a of hose member 18 along said predetermined path independent of the mutual motions between the platform 2 and the third robotic manipulation device 9c.

Outer surfaces of components and the floor surface at the side of the platform 2 also need to be cleaned. In this case, the local control unit 11a is configured to control the robotic manipulation 9c such that it, during certain occasions, moves the end portion 18a of the hose member 18 to different cleaning positions from which it is possible to spray liquid jets against predetermined surfaces and components arranged at the side of the platform 2. In this case, it is possible to use the robotic manipulation device 9c for cleaning itself and other surfaces arranged in the vicinity of the robotic manipulation device 9c.

Figure 3:
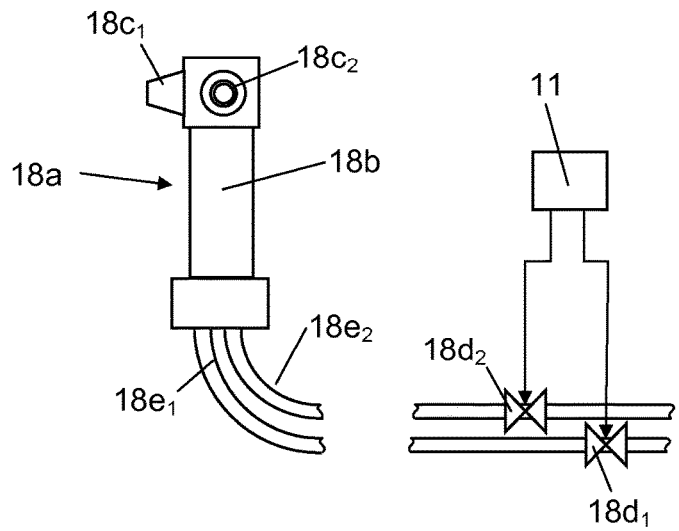
FIG. 3 shows an alternative embodiment of a hose member of the apparatus and FIG. 4 shows an alternative embodiment of the apparatus in another kind of rotary parlour.

FIG. 3 shows an embodiment of an alternative hose member 18. The hose member 18 comprises in this case a first nozzle $18c_1$ and a second nozzle $18c_2$ spraying water jets in different directions. In this case, the nozzles $18c_1$, $18c_2$ spray water jets in directions which diverge at an angle of 90°: The water is supplied to the first nozzle $18c_1$ through a separate first hose unit $18e_1$ by means of a first valve $18d_1$. The water is supplied to the second nozzle $18c_2$ through a separate second hose unit $18e_2$ by means of a second valve $18d_2$. The control unit 11 controls the first valve $18d_1$ and a second valve $18d_2$. It is here possible to spray water jets, at the same time, to two different surfaces in the milking stall 3 by means of the nozzles $18c_1$, $18c_2$. The nozzles $18c_1$, $18c_2$ may have a design such they provide different types of water jets. In this case, it is possible to select and use one of nozzles $18c_1$, $18c_2$ each time a surface in the milking stall 3 is to be cleaned.

Figure 4:
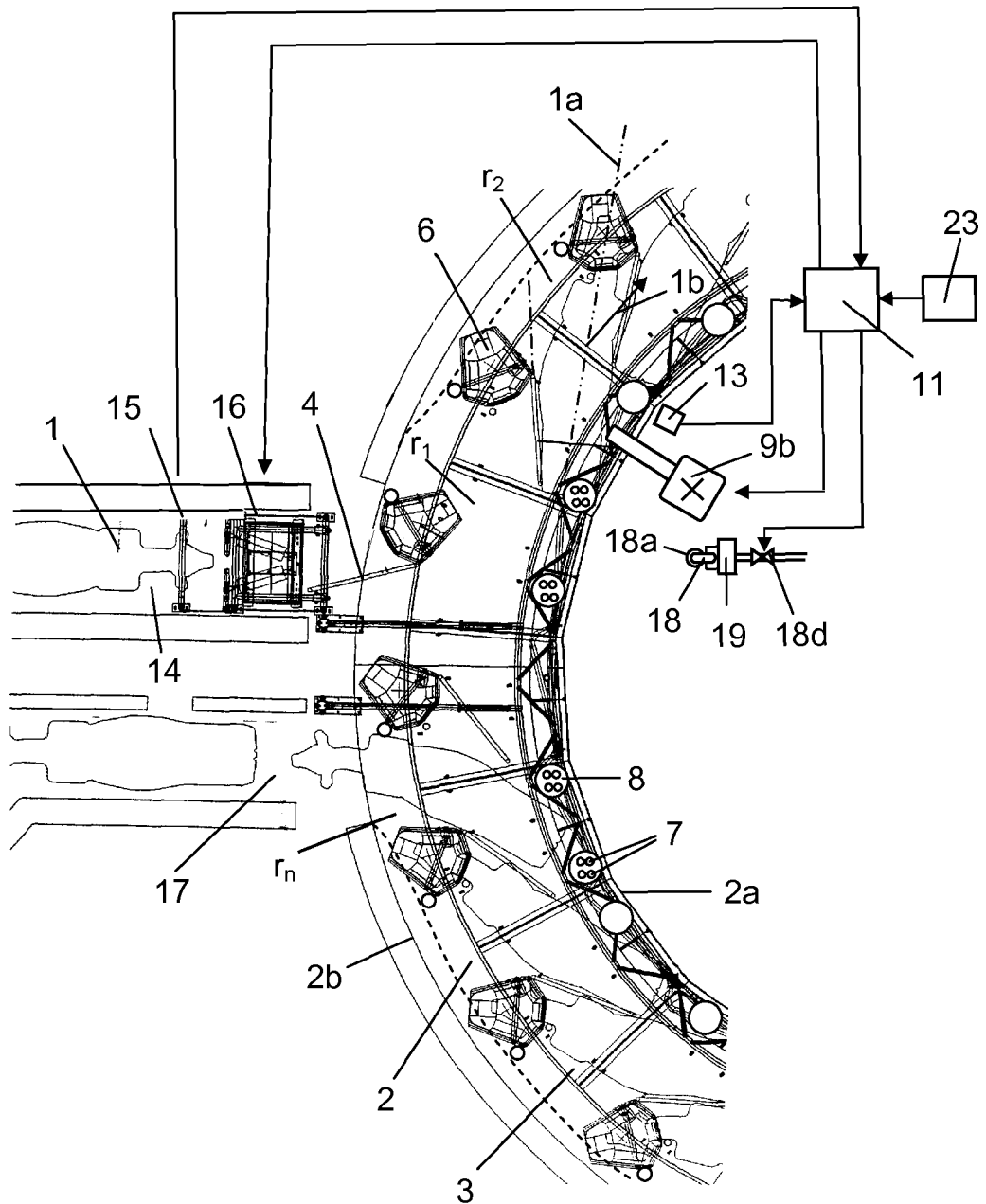

FIG. 4 shows a part of an alternative rotary parlour comprising an annular rotary platform 2. In this case, the platform 2 comprises rotatable fence arrangement 4 dividing the platform 2 into milking stalls 3 for receiving individual cows 1 in predetermined milking positions. By the use of rotatable fence members 4, it is possible to position the cows 1 very close together on the platform 2. Each fence apparatus 4 carries a feeding trough 6. In this case, the cows 1 are arranged on the platform 2 such that the longitudinal axis 1a of the respective cows forms an angle to the direction of motion 1b of the cows 1 on the platform 2 which is less than 90 degrees. This rotary parlour is of the HBR (Herringbone Rotary) type. The cows 1 are arranged in a herringbone pattern on the platform 2. The heads of the cows 1 are here at an outer edge portion 2b of the platform 2.

An entrance passage 14 and an exit area 17 for the cows 1 are located adjacent to each other at the outer edge portion 2b of the platform 2. An identification sensor 15 and a gate 16 are arranged in the entrance passage 14. A control unit 11 of a global control system for the rotary parlour receives information from the identification sensor 15 about the identity of the cows 1 and controls the motions of the gate 16. A teat cup magazine 8 for teat cups 7 are arranged in each milking stall 3 in the vicinity of the inner edge portion 2a of the platform 2. The teat cup magazines 8 are arranged in a space located on one side of a cow 1 in a milking stall 3 on the platform 2 and behind a cow 1 standing in an adjacent milking stall 3. When the cows 1 are arranged in a herringbone pattern on a platform 2, the above-mentioned space is normally empty. Therefore, it is suitable to use this space for the teat cup magazines 8. A robotic manipulation device 9b is arranged on a floor surface in a position at the inner edge portion 2a of the platform 2. The cows 1 leave the milking stalls 3 when they are in a last rotational position $r_n$.

A hose member 18 is arranged in a holding device 19 at the inside of the platform 2 in the vicinity of the robotic manipulation device 9c. The robotic manipulation device 9b is controlled the control unit 11 of the global control system. The control unit 11 controls further the supply of water to the hose member 18 by means of a valve 18d. The control unit 11 receives substantially continuously information from a position sensor 13 about the rotational position of the platform 2.

Batch milking is practised in this rotary parlour. Thus, a herd of cows 1 are moved to the rotary parlour whereupon the cows 1 in the herd are milked in proper order. During operation of the rotary parlour, a cow 1 in the entrance passage 14 enters a milking stall 3 on the platform 2 which is in a first rotational position $r_1$. The robotic manipulation device 9 fetches teat cups 7 from the teat cup magazine 8 and attaches them to a cow 1 standing in a milking stall 3 in a second rotational position $r_2$. The teat cups 7 are removed from the cow when the milking process has been finished. The cows 1 leave the platform 2 when the milking stall 3 arrives to the last rotational position $p_n$. When all cows 1 in the herd have been milked, it is time to clean all milking stalls 3 on the rotary platform 2.

In this case, an operator pushes down a button 23 or the like informing the control unit 11 that the milking stalls 3 are to be cleaned. The control unit 11 activates the second robotic manipulation device 9b such that it grips the hose member 18 in the holding device 19. The robotic manipulation device 9b moves the end portion 18a of the hose member 18 from a parking position $p_0$ in the holding device 19 to different positions $p_n$ from which water jets are sprayed out from a nozzle 18c in the end portion 18a of the hose member 18 to predetermined surfaces in the milking stall 3. The milking stall 3 is here in the second rotational position $r_2$. When a first milking stall 3 has been cleaned, the robotic manipulation device 9b starts a new cleaning process of a following milking stall 3 on the platform 2 when it arrives to the second rotational position $r_2$. The milking stalls 3 are here cleaned in proper order. When all milking stalls 3 on the platform have been cleaned, the robotic manipulation device 9b moves the hose member 18 back to the parking position $p_0$ in holding device 19. Alternatively, the robotic manipulation device 9b drops the grip member 9ca of the hose member 18 on the floor surface 2d in the milking stall 3 whereupon the hose member 18 is automatically retracted to the parking position $p_0$ in the holding device 19 by means of a pneumatic cylinder, electric motor or the like in the holding member 19. In this case, the robotic manipulation device 9b is primary used for attaching the teat cups 7 to the cows 1 to be milked and additionally used for performing a cleaning process of the milking stalls 3. The grip area 18b of the end portion 18a of the hose member 18 may have the same size and shape as the grip area of teat cups 7.

The invention is not restricted to the described embodiment but may be varied freely within the scope of the claims. It may be used in any kind of milking parlour, and in both voluntary and batch milking systems. The robotic manipulation device 9b, the hose member 18 and the holding device 19 may have a substantially arbitrary but functional design.

The invention claimed is:

1. An apparatus for cleaning milking stalls (3) on a platform of a rotary parlour, comprising:
   a hose member (18) having an end portion (18a) with an outlet opening (18c, 18c1, 18c2), wherein during a cleaning process liquid jets are sprayed out through the outlet opening (18c, 18c1, 18c2);
   a liquid regulating element (18d, 18d1, 18d2) that regulates liquid supply to the end portion (18a) of the hose member (18);
   a holding device (19) that holds the end portion (18a) of the hose member (18) in a predetermined parking position (p0);
   a robotic manipulation device (9a, 9b, 9c) that performs i) a primary task in the milking stalls (3), and ii) an additional task in which the robotic manipulation device (9a, 9b, 9c) grips the end portion (18a) being held in the parking position (p0) and then moves the end portion (18a) from the parking position (p0) to a number of different cleaning positions (pn); and
   a control unit (11, 11a) operatively connected to the robotic manipulation device (9a, 9b, 9c), and that i) at a time to clean one of the milking stalls (3), activates the robotic manipulation device (9a, 9b, 9c) such that instead of performing the primary task, the robotic manipulation device (9a, 9b, 9c) performs the additional task in which the robotic manipulation device (9a, 9b, 9c) grips the end portion (18a) of the hose member (18) being held in the holding device (19) and then moves the end portion (18a) from the parking position (p0) to the number of different cleaning positions (pn) from which liquid jets are sprayed from the outlet opening (18c, 18c1, 18c2) of the end portion (18a) against predetermined surfaces to be cleaned in the one milking stall (3).

2. The apparatus according to claim 1, wherein the control unit (11, 11a) further controls the robotic manipulation device (9c) such that the robotic manipulation device (9c) moves the end portion (18a) of the hose member (18) to the number of different cleaning positions (pn) along a predetermined moving path during the cleaning process of predetermined surfaces in the one milking stall (3).

3. The apparatus according to claim 1, wherein the control unit (11, 11a) is operatively connected to the liquid regulating element and controls the liquid regulating means (18d, 18d1, 18d2) to control a quantity of the liquid jets sprayed against different surfaces in the one milking stall.

4. The apparatus according to claim 1, wherein the primary task of the robotic manipulation device (9b) is to attach teat cups to an animal in the one milking stall.

5. The apparatus according to claim 1, wherein the primary task of the robotic manipulation device (9b) is to perform a treatment of teats of an animal (1) in the one milking stall (3) after a milking process has been finished.

6. The apparatus according to claim 1, wherein the primary task of the robotic manipulation device (9b) is to perform a treatment of teats of animals (1) in the milking stalls (3) before a milking process is performed.

7. The apparatus according to claim 1, further comprising a detecting member (20) that detects a presence of impurities in the one milking stall (3) and sends information of the detected presence of impurities in the one milking stall (3) to the control unit (11, 11a).

8. The apparatus according to claim 7, wherein, based on the information of the detected presence of impurities in the one milking stall (3), the control unit (11, 11a) determines surfaces in the one milking stall (3) to clean and activates the robotic manipulation device (9b, 9c) such that the robotic manipulation device (9b, 9c) moves the end portion (18a) of the hose member (18) to selected cleaning positions (pn) from which to clean the determined surfaces in the one milking stall (3).

9. The apparatus according to claim 8, wherein the control unit (11, 11a) further determines, based on the information of the detected presence of impurities in the one milking stall (3), whether or not the one milking stall (3) is to be cleaned.

10. The apparatus according to claim 1, wherein the holding device (19) and the robotic manipulation device (9c) are arranged radially outside of an outer edge portion (2b) of the platform (2).

11. The apparatus according to claim 1, wherein the holding device (19) and the robotic manipulation device (9b) are arranged radially inside of an inner edge portion (2a) of the platform (2).

12. The apparatus according to claim 1, wherein the control unit (11) further controls the robotic manipulation device (9c) to move the end portion (18a) of the hose member (18) to a cleaning position (pn) to spray liquid jets against a surface to be cleaned outside the one milking stall (3).

13. A method for cleaning milking stalls (3) on a platform of a rotary parlour, comprising the steps of:

having a hose member (18) with an end portion (18a) with an outlet opening (18c, 18c1, 18c2), wherein during a cleaning process liquid jets are sprayed out through the outlet opening (18c, 18c1, 18c2);

having a liquid regulating element (18d, 18d1, 18d2) that regulates liquid supply to the end portion (18a) of the hose member (18);

having a holding device (19) hold the end portion (18a) of the hose member (18) in a predetermined parking position (p0);

having a robotic manipulation device (9a, 9b, 9c) that operates to perform i) a primary task in the milking stalls (3), and ii) an additional task in which the robotic manipulation device (9a, 9b, 9c) grips the end portion (18a) being held in the parking position (p0) and then moves the end portion (18a) from the parking position (p0) to a number of different cleaning positions (pn); and with a control unit (11, 11a) operatively connected to the robotic manipulation device (9a, 9b, 9c), i) at a time to clean one of the milking stalls (3), activating the robotic manipulation device (9a, 9b, 9c) such that instead of the robotic manipulation device (9a, 9b, 9c) performing the primary task, the robotic manipulation device (9a, 9b, 9c) performs the additional task in which the robotic manipulation device (9a, 9b, 9c) grips the end portion (18a) of the hose member (18) being held in the holding device (19) and then moves the end portion (18a) from the parking position (p0) to the number of different cleaning positions (pn) from which liquid jets are sprayed from the outlet opening (18c, 18c1, 18c2) of the end portion (18a) against predetermined surfaces to be cleaned in the one milking stall (3).

14. The method according to claim 13, wherein the control unit (11, 11a) further controls the robotic manipulation device (9c) such that the robotic manipulation device (9c) moves the end portion (18a) of the hose member (18) to the number of different cleaning positions (pn) along a predetermined moving path during the cleaning process of predetermined surfaces in the one milking stall (3).

15. The method according to claim 13, wherein the control unit (11, 11a) is operatively connected to the liquid regulating element and controls the liquid regulating element (18d, 18d1, 18d2) to control a quantity of the liquid jets sprayed against different surfaces in the one milking stall.

16. The method according to claim 13, comprising the further step of using a detecting member (20) to detect a presence of impurities in the one milking stall (3) and send information of the detected presence of impurities in the one milking stall (3) to the control unit (11, 11a).

17. The method according to claim 16, wherein, based on the information of the detected presence of impurities in the one milking stall (3), the control unit (11, 11a) determines surfaces in the one milking stall (3) to clean and activates the robotic manipulation device (9b, 9c) such that the robotic manipulation device (9b, 9c) moves the end portion (18a) of the hose member (18) to selected cleaning positions (pn) from which the determined surfaces in the one milking stall (3) are cleaned.

18. The method according to claim 17, wherein the control unit (11, 11a) further determines, based on the information of the detected presence of impurities in the one milking stall (3), whether or not the one milking stall (3) is to be cleaned.

19. The method according to claim 13, wherein, the primary task of the robotic manipulation device (9b) is one of the group consisting of:

i) to attach teat cups to an animal in the one milking stall, ii) to perform a treatment of teats of an animal (1) in the one milking stall (3) after a milking process has been finished, and iii) to perform a treatment of teats of animals (1) in the milking stalls (3) before a milking process is performed.

20. The method according to claim 13, wherein the control unit (11) further controls the robotic manipulation device (9c) to move the end portion (18a) of the hose member (18) to a cleaning position (pn) to spray liquid jets against a surface to be cleaned outside the one milking stall (3).

* * * * *